United States Patent

[11] 3,547,019

| [72] | Inventors | Shigeru Matsubara;<br>Yasutoshi Okuzawa, Tokyo, Japan |
|---|---|---|
| [21] | Appl. No. | 682,957 |
| [22] | Filed | Nov. 14, 1967 |
| [45] | Patented | Dec. 15, 1970 |
| [73] | Assignee | Fuji Shashin Film Kabushiki Kaisha<br>Kanagawa, Japan |
| [32] | Priority | Nov. 14, 1966 |
| [33] | | Japan |
| [31] | | No. 41/104831 |

[54] FILTER CORRECTION WARNING DEVICE
3 Claims, 3 Drawing Figs.

[52] U.S. Cl................................................ 95/11,
95/10, 95/31; 352/78
[51] Int. Cl.................................................. G03b 19/00
[50] Field of Search.................................... 95/11, 10,
31; 352/78, 72

[56] References Cited
UNITED STATES PATENTS

| 2,952,195 | 9/1960 | Babcock et al. | 95/11 |
| 3,179,027 | 4/1965 | Swarofsky | 95/11 |
| 3,208,363 | 9/1965 | Easterly et al. | 352/78 |
| 3,314,344 | 4/1967 | Anwyl et al. | 95/11 |
| 3,395,630 | 8/1968 | Haufler et al. | 95/11 |
| 3,421,422 | 1/1969 | Winkler | 95/11 |
| 3,444,798 | 5/1969 | Mayr et al. | 352/141X |

Primary Examiner—John M. Horan
Assistant Examiner—Robert P. Greiner
Attorney—Sughrue, Rothwell, Mion, Zinn & MacPeak ABSTRACT: A filter correction warning device having a view finder mask with a projection which engages the side of a magazine carrying photographic film of a particular sensitivity or is received within a recess of another film magazine of different film sensitivity. The finder mask is spring biased but pivotably connected to an arm carrying a color-correcting filter which is manually moved into operative position and for a correct film, the projection moves into the recess of the film magazine. If the projection engages an unrecessed wall of a film magazine, the finder mask overlies the view finder to warn the cameraman.

INVENTORS
SHIGERU MATSUBARA
YASUTOSHI OKUZAWA 3,547,019

FILTER CORRECTION WARNING DEVICE

BACKGROUND OF THE INVENTION

1. Field of the Invention

This invention relates to a warning device for warning a cameraman of the misuse of a color-correcting filter in a camera to be loaded with a film magazine.

2. Description of the Prior Art

In taking color photographs, it is sometimes necessary to use a color-correcting filter appropriate for the type of film and illuminating conditions. In this respect amateur photographers unskilled in photography often misuse the color-correcting filter. Various devices have so far been invented to try to prevent these mistakes.

The object of this invention is to provide a device to prevent mistake by giving the camera operator a warning of misuse of the filter with respect to the spectroscopic sensitivity of the film. A better understanding of the invention may be derived from the following description when considered in conjunction with the accompanying drawings.

DETAILED DESCRIPTION OF THE INVENTION

Figure 3:
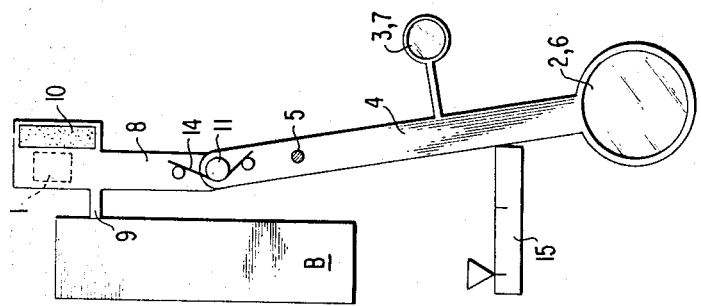
FIG. 3 is a front view of the device shown in FIG. 1 in which the warning finder mask is aligned with the finder for a filter which is going to be misused.

In the drawing, the numeral 1 denotes the finder of a camera; 2 the photographing lens; 3 the photoelectric element connected to an exposure controlling means; 4 an arm which has, at the lower end, a color-correcting filter 6 to be brought into or out of alignment with said lens 2 and, on the side, an exposure correction filter 7 to be brought into or out of alignment with said photoelectric element 3, and which is supported to swing about a fixed axis 5; 8 a finder mask for giving warning of misuse of a filter by aligning itself with said finder 1, and which has on the side thereof a projection 9 to about the outer wall of the film magazine and has on the opposite side of the upper end thereof a filter 10 to be aligned with finder 1, and the lower end thereof is pivotally connected by the axis 11 to the upper end of the arm 4. The numerals 12 and 13 denote pins which are fixed at the lower end of the warning finder mask and at the upper end of the arm, respectively, to hold a spring 14. The spring 14, as shown in the drawing, urges the finder mask 8 in a counterclockwise direction so that the finder mask 8 may constantly maintain a certain fixed angle with arm 4. The numeral 15 denotes a lever which is operated from outside to make the arm 4 swing about the fixed axis 5 so that the filters 6 and 7 may be brought into or out of alignment with the lens 2 and the photoelectric element 3, respectively. A in FIG. 2 and B in FIG. 3 denote the magazine having a film of different spectroscopic sensitivity such as, for example, those of the daylight type and the tungsten type. The magazine has in its outer wall a recess which is engaged with said projection 9. Said finder mask 8 is not necessarily required to intercept the incident light; the mask 8 may be formed of, for example, transparent material having some signs thereon such as a warning mark of a red letter.

Figure 2:
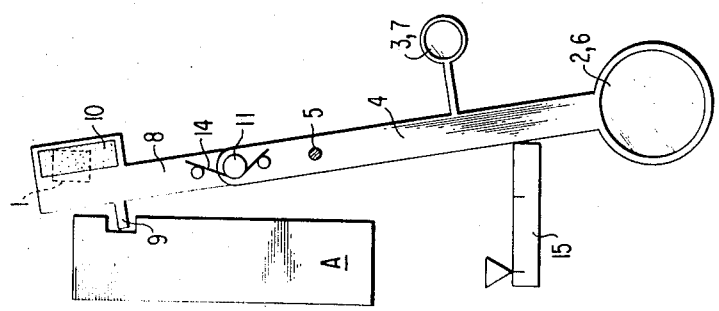
FIG. 2 is a front view of the device shown in FIG. 1 in which a proper filter is used.
Figure 1:
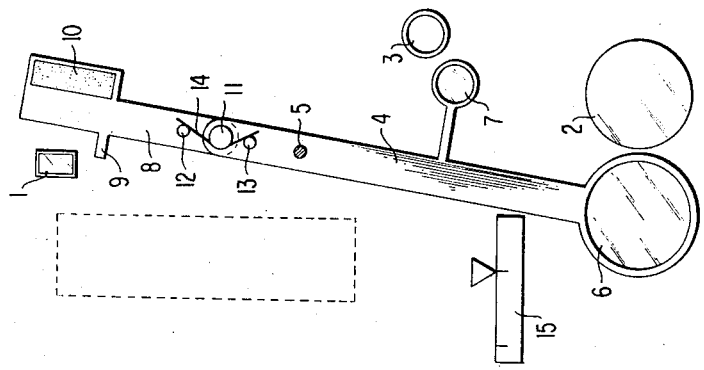
FIG. 1 is a front view of an embodiment of a device according to the invention showing a condition where no filter is used.

In using said device of this invention to make corrections necessary for photographing on a tungsten film under daylight illumination, the filter 6 is made one of the amber-type filters. A recess, such as is mentioned above, is formed in the outer wall of the magazine of the tungsten-type film. Now, the camera is loaded with a tungsten-type film. When the illuminating light is daylight, the lever 15 is pressed to make the arm 4 swing about the axis 5, thereby to bring the amber-type color-correcting filter 6 and the exposure correcting filter 7 into alignment with the lens 2 and the photoelectric element 3, respectively, effecting a right correction. Since, at this moment, the projection 9 is engaged with said recess, the finder mask 8 swings with the arm 4 sufficiently to enable the filter 10 to be aligned with the finder 1, as shown in FIG. 2, so that the photographer is enabled to know that the filter is used correctly. On the other hand, in the case of loading the daylight-type film magazine, which has no recess, if the arm is swung by pressing lever 15 in order to make the filter correction, the aforementioned projection 9 will abut the magazine outer wall, as shown in FIG. 3, thereby preventing the finder mask 8 from swinging, and as the result, causing the arm 4 and the finder mask 8 to buckle at the point of the axis 11 with the warning finder mask 8 placed in alignment with the finder, so that the cameraman is informed of the mistake before photographing. Thereupon, by returning the lever 15 where it was, the arm 4 and the finder mask 8 will be reinstated in their respective original positions, as shown in FIG. 1, to be ready for proper photographing.

Therefore, if the photographer only presses lever 15 to align the correction filter with the camera lens in case where the illuminating light is daylight, regardless of the spectroscopic sensitivity of the film, he can be informed before photographing of whether the correction is proper or not, and thus becomes confident that he will never make any mistake of correction.

If said color correcting filter is a blue-type filter and a recess as mentioned above is formed on a daylight-type film magazine to make correction under tungsten illumination, there results a warning device for filter correction, effective in the reverse case to that referred to above. The same effect is, of course, obtainable even if the filter 10 is provided on the opposite side of the finder mask 8 to that shown in the drawing and a shallower recess is formed on the magazine of a film of the reverse type to that referred to above.

While the present invention, as to its objects and advantages, has been described herein as carried out in specific embodiments thereof, it is not desired to be limited thereby, but it is intended to cover the invention broadly within the spirit and scope of the appended claims.

We claim:

1. In a camera adapted to carry either a film magazine of given sensitivity having an uninterrupted sidewall or another magazine of different film sensitivity having a recess within its sidewall at a corresponding position, and including: a view finder, and a pivotable arm carrying color correcting filter mounted thereon for selective movement into operative position, the improvement comprising: a manually operated lever for pivoting said arm into filter operative position, first means biasing said arm away from filter operative position; a view finder mask pivotably connected to one end of said arm, second biasing means normally maintaining said mask and said arm in a preferred angular orientation such that said mask rotates with said arm; and a sensing surface carried by said mask for contact with a cartridge during pivoting of said arm and said filter into operative position, whereby during shifting of said manual lever said sensing surface of said mask contacts the uninterrupted surface of a film magazine to pivot said mask relative to said arm against said bias to overlie said view finder to immediately indicate to the camera operator misuse of the color correcting filter.

2. A filter correction warning device as defined in claim 1 wherein said filter is an amber-type filter and said recess is provided on a magazine loaded with a tungsten-type film.

3. A filter correction warning device as defined in claim 1 wherein said filter is a blue-type filter and said recess is provided on a magazine loaded with a daylight-type film.